United States Patent
Guggolz et al.

(10) Patent No.: US 8,915,160 B2
(45) Date of Patent: Dec. 23, 2014

(54) GROUP TRANSMISSION DEVICE

(75) Inventors: Manfred Guggolz, Leonberg-Gebersheim (DE); David Ulmer, Schönalch (DE)

(73) Assignee: Daimler AG, Stuttgart (DE)

( * ) Notice: Subject to any disclaimer, the term of this patent is extended or adjusted under 35 U.S.C. 154(b) by 203 days.

(21) Appl. No.: 13/589,144

(22) Filed: Aug. 19, 2012

(65) Prior Publication Data

US 2013/0008271 A1 Jan. 10, 2013

Related U.S. Application Data

(63) Continuation-in-part of application No. PCT/EP2010/007295, filed on Dec. 1, 2010.

(30) Foreign Application Priority Data

Feb. 27, 2010 (DE) .......................... 10 2010 009 673

(51) Int. Cl.
*F16H 59/00* (2006.01)
*F16H 61/70* (2006.01)
*F16H 61/04* (2006.01)

(52) U.S. Cl.
CPC .......... *F16H 61/702* (2013.01); *F16H 61/0403* (2013.01); *F06H 2061/0411* (2013.01); *F06H 2061/0422* (2013.01)
USPC ........................................................ 74/335

(58) Field of Classification Search
CPC ....... F16H 61/688; F16H 3/006; F16H 61/04; F16H 61/0403
USPC ........................................................ 74/335
See application file for complete search history.

(56) References Cited

U.S. PATENT DOCUMENTS

| 3,744,345 | A | * | 7/1973 | Keienburg et al. | 74/745 |
| 5,436,833 | A | * | 7/1995 | Janecke | 701/52 |
| 5,511,437 | A | * | 4/1996 | Braun | 74/331 |
| 6,250,172 | B1 | * | 6/2001 | Pigozzi et al. | 74/336 R |
| 7,987,741 | B2 | * | 8/2011 | Gitt | 74/331 |

* cited by examiner

*Primary Examiner* — Ha D Ho
(74) *Attorney, Agent, or Firm* — Klaus J. Bach

(57) ABSTRACT

In a group transmission arrangement, in particular a commercial vehicle group transmission arrangement, comprising a main group with a central synchronizing unit for synchronizing at least two main group shifting units for changing a main group transmission ratio, includes at least one auxiliary group with at least one auxiliary group shifting unit for changing an auxiliary group ratio, wherein a control unit is provided to actuate in a shifting operation the auxiliary group shifting unit and a central synchronizing unit in order to change an overall gear ratio, the control unit is adapted to actuate the auxiliary group shifting unit and the central synchronizing unit in parallel at least intermittently.

10 Claims, 1 Drawing Sheet

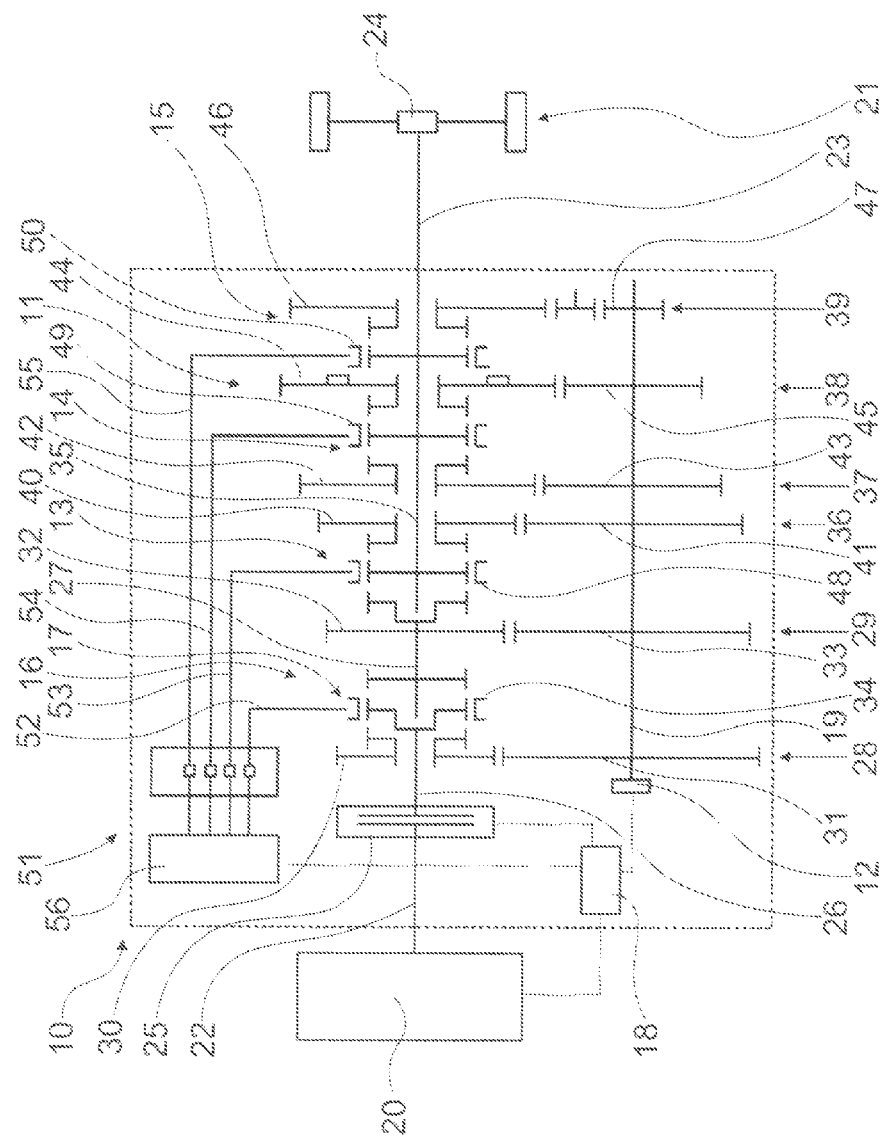

GROUP TRANSMISSION DEVICE

This is a Continuation-In-Part application of pending international patent application PCT/EP2010/007295 filed Dec. 1, 2010 and claiming the priority of German patent application 10 2010 009673 filed Feb. 27, 2010.

BACKGROUND OF THE INVENTION

The invention relates to a group transmission device, in particular for commercial vehicles, including a main group with a central synchronizing unit for synchronizing at least two main group shifting units and an auxiliary group with an auxiliary group shifting unit.

A group transmission device is already known from DE 101 52 857 A1; this comprises a main group with a central synchronizing unit for synchronizing main group shifting units for changing a main group ratio, an auxiliary group with auxiliary group shifting units for changing an auxiliary group ratio and an open- and/or closed-loop control unit which is provided to actuate in a shifting operation the auxiliary group shifting units and the central synchronizing unit in order to change an overall gear ratio.

It is the principal object of the invention to provide a group transmission arrangement with shortened gear change times so as to facilitate up-shifting during vehicle acceleration and downshifting particularly during hill climbing.

SUMMARY OF THE INVENTION

In a group transmission arrangement, in particular a commercial vehicle group transmission arrangement, comprising a main group with a central synchronizing unit for synchronizing at least two main group shifting units for changing a main group transmission ratio, includes at least one auxiliary group with at least one auxiliary group shifting unit for changing an auxiliary group ratio, wherein a control unit is provided to actuate in a shifting operation the auxiliary group shifting unit and a central synchronizing unit in order to change an overall gear ratio, the control unit is adapted to actuate the auxiliary group shifting unit and the central synchronizing unit in parallel at least intermittently.

The control unit is an open- and/or closed-loop control unit which is provided to actuate the auxiliary group shifting unit and the central synchronizing unit in parallel at least intermittently. By this intermittent parallel actuation, the auxiliary group shifting unit can be pre-synchronized while the main group shifting unit is being synchronized. As a result, gear change operations for changing the overall gear ratio, in particular, in which both the main and the auxiliary group are shifted, can be performed faster, thereby shortening gear change times. By shortening the gear change times, on the other hand, a gear change strategy of the open- and/or closed-loop control unit can be user-optimized, as the gear changes are fast and comfortable in the implementation of this gear change strategy. The term "parallel actuation" in particular means a simultaneous actuation. in a parallel actuation, an actuation phase of the auxiliary group shifting unit and an actuation phase of the central synchronizing unit preferably coincide. The term "intermittent parallel actuation" should in particular be understood to mean that one of the actuation phases coincides with the other actuation phase. The actuation phases may differ in their durations. An activation point of the actuation phase of the auxiliary group shifting unit may differ from an activation point of the actuation phase of the central synchronizing unit. The term "actuation phase" means a phase in which the auxiliary group shifting unit and/or the central synchronizing unit is/are selected by the open- and/or closed-loop control unit. The phrase "actuation of a shifting unit" should be understood to mean a change of its shifting position. The phrase "actuation of the synchronizing unit" should in particular mean an activation in which the synchronizing unit provides a synchronizing action. The term "central synchronizing unit" means a synchronizing unit which is assigned to several shifting units. The central synchronizing unit is preferably an active central synchronizing unit. The term "active central synchronizing unit" means a central synchronizing unit which can provide a synchronizing action independent of an actuation of a shifting unit. The active central synchronizing unit preferably changes a speed of the main group actively, for example a speed of the idler gears or a gearbox shaft assigned to the main group, until a speed difference is small enough.

It is further proposed that the auxiliary group shifting unit comprises a synchronizer and that the open- and/or closed-loop control unit is provided to actuate the central synchronizing unit of the main group during a synchronization phase of the auxiliary group shifting unit. In this way, it is possible for the open- and/or closed-loop control unit to actuate the central synchronizing unit of the main group before a fixed connection of the auxiliary group shifting unit is obtained. The actuation phase of the auxiliary group shifting unit is preferably shorter than the actuation phase of the central synchronizing unit. The actuation phase of the auxiliary group shifting unit preferably comprises a synchronization phase and a through-shift. The term "synchronization phase" should in particular be understood to mean a phase in which there is a frictional connection between at least two group transmission elements as a result of the synchronization of the auxiliary group shifting unit. The term "through-shift" should in particular be understood to mean the provision of a positive connection between the at least two group transmission elements by the auxiliary group shifting unit.

In an advantageous further development, the open- and/or closed-loop control unit is provided to synchronize the auxiliary group shifting unit at least partially by means of the central synchronizing unit. In this way, the wear of the synchronizer of the auxiliary group shifting unit can be reduced. The term "partial synchronization" should in particular be understood to mean that a speed difference of the auxiliary group shifting unit is reduced. After partial synchronization, the differential speed preferably has a value greater than zero.

It is further proposed that the central synchronizing unit comprises at least one active synchronizing actuator with a gearbox-mounted stator which is provided to change a speed of a gearbox shaft. This allows the implementation of active synchronization by simple means. The term "active synchronizing actuator" should in particular be understood to mean an actuator which is capable of providing a synchronizing torque if required. The active synchronizing actuator is preferably controlled by the open- and/or closed-loop control unit. The active synchronizing actuator is preferably in the form of a brake and/or an electric motor.

In a particularly preferred embodiment, the central synchronizing unit is pressure-controlled and the open- and/or closed-loop control unit is provided to apply an actuating pressure to the central synchronizing unit in an actuation phase of the auxiliary group shifting unit. In this way, a parallel actuation of the auxiliary group shifting unit and the central synchronizing unit can be obtained by simple means. The term "pressure-controlled" should in particular be understood to refer to a pneumatically and/or hydraulically actuated brake.

It is further proposed that the auxiliary group shifting unit is pressure-controlled and the open- and/or closed-loop control unit is provided to apply an actuating pressure to the auxiliary group shifting unit before the actuating pressure is applied to the central synchronizing unit. In this way, the actuation phase of the central synchronizing unit can be placed into the actuation phase of the auxiliary group shifting unit in a simple manner.

It is particularly advantageous if the open- and/or closed-loop control unit is provided to apply the actuating pressure to the central synchronizing unit in a synchronization phase of the auxiliary group shifting unit. In this way, the central synchronizing unit can support the synchronization of the auxiliary group shifting unit.

It is further advantageous if the open- and/or closed-loop control unit is capable of reducing the actuating pressure of the central synchronizing unit essentially to zero during the actuation phase of the auxiliary group shifting unit. This makes the operation of the central synchronizing unit easier.

It is further proposed that the open- and/or closed-loop control unit is in at least one operating state provided to reduce the actuating pressure of the central synchronizing unit essentially to zero before the synchronization phase of the auxiliary group shifting unit is completed. This prevents a slipping of positive tooth engagements, thereby improving shifting comfort.

The invention and advantageous embodiments will become more readily apparent from the following description on the basis of the accompanying drawing. The drawing, the description and the claims contain many features in combination. Those skilled in the art will expediently consider these features individually as well and combine them to provide further useful combinations.

BRIEF DESCRIPTION OF THE DRAWING

FIG. 1 is a diagrammatic representation of a drive train of a commercial vehicle fitted with a group transmission.

DESCRIPTION OF A PARTICULAR EMBODIMENT

The group transmission 10 is a commercial vehicle group transmission, for example in the form of a heavy transport vehicle group transmission. FIG. 1 shows a motor 20 and drive wheels 21 of a heavy commercial vehicle not shown in detail. The motor 20 is an internal combustion engine. To introduce a torque into the group transmission 10, the group transmission 10 is provided with a drive shaft 22. The drive shaft 22 connects the group transmission 10 to the motor 20. For the transmission of a torque determined by an overall gear ratio, the group transmission 10 has an output shaft 23 by which the group transmission 10 is connected to the drive wheels 21 via an axle drive 24.

In order to establish and break a connection between the group transmission 10 and the motor 20, the group transmission 10 is provided with a clutch 25 in the form of a multi-plate clutch. The clutch 25 has two actuation states. In the first actuation state, the clutch 25 is open. In the open actuation state, the clutch 25 is non-pressurized. In the open actuation state, the connection between the group transmission 10 and the motor 20 is broken. In the second actuation state, the clutch 25 is closed. In the closed actuation state, the clutch 25 is pressurized. In the closed actuation state, the connection between the group transmission 10 and the motor 20 is established. In a power flow, the motor 20 is situated upstream of the clutch 25.

To provide the overall gear ratio, the group transmission 10 comprises an auxiliary group 16 and a main group 11. The main group 11 includes a countershaft 19 which extends parallel to the drive shaft 22.

The auxiliary group 16 is connected to the clutch 25 by a gearbox input shaft 26 extending parallel to the drive shaft 22. The auxiliary group 16 can be connected to the main group 11 via an intermediate shaft 27 or via the countershaft 19. In the power flow, the auxiliary group 16 is situated downstream of the clutch 25 and upstream of the main group 11. To provide an effective connection between the gearbox input shaft 26 and the countershaft 19, the auxiliary group 16 comprises two different gear pairings 28, 29. The gear pairings 28, 29 have different ratios. The gear pairing 28 comprises an idler gear 30 rotatably mounted on the gearbox input shaft 26 and a fixed gear 31 mounted on the counter shaft 19 for rotation therewith. The gear pairing 29 comprises a fixed gear 32 mounted on the intermediate shaft 27 and a fixed gear 33 mounted on the gearbox shaft 19. For adjusting and changing an auxiliary group ratio, the auxiliary group 16 comprises an auxiliary group shifting unit 17. The auxiliary group shifting unit 17 is pressure-controlled. The auxiliary group shifting unit 17 comprises a synchronizer which is a mechanical synchronizer. For adapting a speed of the idler gear 30 and the gearbox input shaft 26, the synchronizer establishes a frictional connection between the gearbox input shaft 26 and the idler gear 30 in a synchronization phase. For adapting a speed of the intermediate shaft 27 and the gearbox input shaft 26, the synchronizer establishes a frictional connection between the gearbox input shaft 26 and the intermediate shaft 27 in a synchronization phase. As soon as a differential speed of the gearbox input shaft 26 and the idler gear 30 or the intermediate shaft 27 approaches zero, the auxiliary group shifting unit 17 establishes in a through-shift a positive connection between the respective idler gear 30 and the gearbox input shaft 26 or the intermediate shaft 27. For this purpose, the synchronizer comprises a synchronizer hub with two synchronizer rings.

The auxiliary group shifting unit 17 has two shifting positions and a neutral position. For shifting to the shifting positions and the neutral position, the auxiliary group shifting unit 17 comprises a selector sleeve 34. The selector sleeve 34 is axially displaceable relative to the gearbox input shaft 26 and the intermediate shaft 27. In the first shifting position, the auxiliary group shifting unit 17 connects the gearbox input shaft 26 to the countershaft 19 via the gear pairing 28. In the second shifting position, the auxiliary group shifting unit 17 connects the gearbox input shaft 26 to the intermediate shaft 27 and therefore also to the gearbox shaft 19 via the gear pairing 29. In the neutral position, the auxiliary group shifting unit 17 disconnects the gearbox input shaft 26 from the gearbox shaft 19 and the intermediate shaft 27.

The main group 11 is connected to the output shaft 23 by a main shaft 35 which is coaxial with the intermediate shaft 27. The main shaft 35 and the output shaft 23 are designed in one piece. The main group 11 forms the main gearbox. The main group 11 is arranged upstream of the drive wheels 21 in the power flow. To provide an effective connection between the main shaft 35 and the countershaft 19, the main group 11 comprises four different gear pairings 36, 37, 38, 39. The gear pairings 36, 37, 38, 39 have different ratios. The gear pairing 36 comprises an idler gear 40 rotatably mounted on the main shaft 35 and a fixed gear 41 firmly mounted on the countershaft 19. The gear pairing 37 comprises an idler gear 42 rotatably mounted on the main shaft 35 and a fixed gear 43 mounted on the counter shaft 19. The gear pairing 38 comprises an idler gear 44 rotatably mounted on the main shaft 35 and a fixed gear 45 mounted on the counter shaft 19. The gear pairing 39 comprises an idler gear 46 rotatably mounted on the main shaft 35, a fixed gear 47 fixedly mounted on the counter shaft 19 and a reversing gear and is so as to form a reverse gear.

For adjusting and changing a main group ratio, the main group 11 comprises three main group shifting units 13, 14, 15. The main group shifting units 13, 14, 15 are fluid-pressure-controlled. Each of the main group shifting units 13, 14, 15 has two shifting positions and a neutral position. For shifting to the shifting positions and the neutral position, each of the main group shifting units 13, 14, 15 comprises a selector sleeve 48, 49, 50 The selector sleeves 48, 49, 50 are axially displaceable relative to the main shaft 35. The selector sleeve 48 is assigned to the main group shifting unit 13, the selector sleeve 49 is assigned to the main group shifting unit 14 and the selector sleeve 50 is assigned to the main group shifting unit 15.

The main group shifting unit 13 has a neutral position and two shifting positions. In the first shifting position of the main group shifting unit 13, the main group shifting unit 13 connects the main shaft 35 to the intermediate shaft 27 and, via the gear pairing 29, to the counter shaft 19. In the second shifting position of the main group shifting unit 13, the main group shifting unit 13 connects the main shaft 35 to the gearbox countershaft 19 via the gear pairing 36. In the neutral position of the main group shifting unit 13, the main group shifting unit 13 disconnects the main shaft 35 from the intermediate shaft 27 and the countershaft 19.

The main group shifting unit 14 has a neutral position and two shifting positions. In the first shifting position of the main group shifting unit 14, the main group shifting unit 14 connects the main shaft 35 to the countershaft 19 via the gear pairing 37. In the second shifting position of the main group shifting unit 14, the main group shifting unit 14 connects the main shaft 35 to the countershaft 19 via the gear pairing 38. In the neutral position of the main group shifting unit 14, the main group shifting unit 14 disconnects the main shaft 35 from the gearbox shaft 19. The main group shifting unit 15 has a neutral position and one shifting position. In the shifting position of the main group shifting unit 15, the main group shifting unit 15 connects the main shaft 35 to the countershaft 19 via the gear pairing 39. In the neutral position of the main group shifting unit 15, the main group shifting unit 15 disconnects the main shaft 35 from the gearbox shaft 19.

For the axial displacement of the selector sleeves 34, 48, 49, 50 and for the selection of the shifting positions and the neutral positions of the auxiliary group shifting unit 17 and the main group shifting units 13, 14, 15, the group transmission device 10 comprises an actuating device 51. The actuating device 51 is pressure-controlled. The actuating device 51 has four selector rods 52, 53, 54, 55. The selector rod 52 moves the selector sleeve 34, the selector rod 53 moves the selector sleeve 48, the selector rod 54 moves the selector sleeve 49 and the selector rod 55 moves the selector sleeve 50. For the pressure-controlled movement of the selector rods 52, 53, 54, 55, the actuating device 51 is provided with a common actuator 56. The actuator 56 is designed as a pneumatic actuator. In principle, the actuating device 51 may comprise several actuators, for example one each for selecting a shifting unit each.

For the synchronization of the three main group shifting units 13, 14, 15, the main group 11 comprises a central synchronizing unit 12. The central synchronizing unit 12 is pressure-controlled. The central synchronizing unit 12 comprises an active synchronizing actuator with a gearbox-mounted stator. The active synchronizing actuator is designed as a brake. The active synchronizing actuator is designed as a pneumatically actuated multi-disc brake. The central synchronizing unit 12 changes the speed of the countershaft 19 by braking the counter shaft 19 relative to a gearbox housing. The central synchronizing unit 12 therefore adapts a speed of the countershaft 19 designed as a layshaft to the speed of the main shaft 35 by decelerating the countershaft 19. The central synchronizing unit 12 is therefore assigned to all three main group shifting units 13, 14, 15.

For adjusting and changing the overall gear ratio, the group transmission device 10 comprises an electronic open- and closed-loop control unit 18. The open- and closed-loop control unit 18 communicates with the motor 20, the actuator 56, the clutch 25 and the central synchronizing unit 12. The open- and closed-loop control unit 18 actuates the auxiliary group shifting unit 17 and the main group shifting units 13, 14, 15 via the actuator 56. Via the active synchronizing actuator, the open- and closed-loop control unit 18 actuates the central synchronizing unit 12.

An actuation period of the central synchronizing unit 12, in which the synchronizing actuator is active and applies a braking torque to the countershaft 19, can be variably set by the open- and closed-loop control unit 18. To set the actuation period, the open- and closed-loop control unit 18 communicates with a sensor system not shown in detail. This sensor system covers several characteristic values of the group transmission device 10.

For the adaptation of the actuation period of the central synchronizing unit 12, the open- and closed-loop control unit 18 has an adaptation function. The adaptation function adapts the actuation period as a function of the characteristic values. The open- and closed-loop control unit 18 determines from the characteristic values a speed jump of the countershaft 19 at a change of the overall gear ratio. The adaptation function therefore adapts the actuation period of the central synchronizing unit 12 in response to the speed jump of the countershaft 19. The speed jump determined by the open- and closed-loop control unit 18 is therefore a difference between an actual speed of the countershaft 19 at the start of a shifting operation and a target speed of the countershaft 19 which is desired after the shifting operation. The adaptation function adapts the actuation period of the central synchronizing unit 12 in response to the target speed being reached after the shifting operation.

In a part of the upshifting operation, the open- and closed-loop control unit 18 first moves the clutch 25 into its open operating state for selecting a next higher gear. Then, the open- and closed-loop control unit 18 actuates the auxiliary group shifting unit 17, the main group shifting units 13, 14, 15 and the central synchronizing unit 12. In this process, the open- and closed-loop control unit 18 intermittently actuates the auxiliary group shifting unit 17 and the central synchronizing unit 12 in parallel. For a defined period of time, the open- and closed-loop control unit 18 actuates the central synchronizing unit 12 and the auxiliary group shifting unit 17 simultaneously. The synchronizing actuator of the central synchronizing unit 12 is therefore active while the auxiliary group shifting unit 17 is being actuated. By braking the countershaft 19, the central synchronizing unit 12 actively changes the speed of the countershaft 19 and reduces a speed differential in the main group shifting units 13, 14, 15.

The open- and closed-loop control unit 18 actuates the central synchronizing unit 12 of the main group 11 during the synchronization phase of the auxiliary group shifting unit 17, i.e. during a phase in which the auxiliary group shifting unit 17 is being synchronized. By means of the parallel actuation of the auxiliary group shifting unit 17 and the central synchronizing unit 12, the open- and closed-loop control unit 18 partially synchronizes the auxiliary group shifting unit 17. By means of the parallel actuation, the open- and closed-loop control unit 18 supports the synchronization of the auxiliary group shifting unit 17. After the open- and closed-loop control unit 18 has shifted the auxiliary group shifting unit 17 and the respective main group shifting unit 13, 14, 15, it moves the clutch 25 into its closed operating state.

The following description is based on an operating state in which an overall gear ratio is set by the second shifting position of the auxiliary group shifting unit 17 and the first shifting position of the main group shifting unit 14. The main group shifting units 13 and 15 are in their neutral positions. The overall gear ratio results from the auxiliary group ratio set by the second shifting position of the auxiliary group shifting unit 17 and the main group ratio set by the first shifting position of the main group shifting unit 14.

In an example of a shifting operation in which, starting from the operating state described above, a driver of the commercial vehicle demands a next higher gear; the open- and closed-loop control unit 18 first reduces the actuating pressure of the clutch 25. By doing this, the open- and closed-loop control unit 18 moves the clutch 25 into its open state. In this way, the open- and closed-loop control unit 18 disconnects the group transmission device 10 from the motor 20.

The open- and closed-loop control unit 18 then applies an actuating pressure to the main group shifting unit 14. By applying pressure to the main group shifting unit 14, the actuator 56 displaces the selector sleeve 49 with the selector rod 54 axially towards the drive wheels 21 thereby moving the main group shifting unit 14 into its neutral position. The open- and closed-loop control unit 18 then applies an actuating pressure via the active synchronizing actuator to the central synchronizing unit 12 during an actuation phase of the auxiliary group shifting unit 17, In this way, the open- and closed-loop control unit 18 actuates the central synchronizing unit 12 while the auxiliary group shifting unit 17 is actuated. In this process, the open- and closed-loop control unit 18 applies pressure to the auxiliary group shifting unit 17 before applying the actuating pressure to the central synchronizing unit 12.

By applying pressure to the auxiliary group shifting unit 17, the actuator 56 displaces the selector sleeve 34 with the selector rod 53 axially towards the motor 20. The actuator 56 thereby moves the auxiliary group shifting unit 17 into its first shifting position and sets a higher auxiliary group ratio in the auxiliary group 16. In this process, the synchronizer of the auxiliary group shifting unit 17 operates and synchronizes, during the actuation phase of the auxiliary group shifting unit 17, the idler gear 30 and the gearbox input shaft 26 in the synchronization phase of the auxiliary group shifting unit 17. During the synchronization phase of the auxiliary group shifting unit 17, the open- and closed-loop control unit 18 applies the actuating pressure to the central synchronizing unit 12.

After the synchronization phase, i.e. when a differential speed of the idler gear 30 and the gearbox input shaft 26 approaches zero, the auxiliary group shifting unit 17 establishes a positive connection between the idler gear 30 and the gearbox input shaft 26 by through-shifting. After the through-shift, the auxiliary group shifting unit 17 is in its first shifting position and the higher auxiliary group ratio is set. The synchronization phase and the through-shift of the auxiliary group shifting unit 17 are typically completed after approximately 200 milliseconds.

During the actuation phase of the auxiliary group shifting unit 17, the open- and closed-loop control unit 18 sets the actuating pressure of the central synchronizing unit 12 to almost zero. The actuation phase of the central synchronizing unit 12 therefore lies within the actuation phase of the auxiliary group shifting unit 17. The open- and closed-loop control unit 18 reduces the actuating pressure of the central synchronizing unit 12 to almost zero before the synchronization phase of the auxiliary group shifting unit 17 is completed. The open- and closed-loop control unit 18 therefore actuates the central synchronizing unit 12 only in the synchronization phase of the auxiliary group shifting unit 17. During the through-shift, the central synchronizing unit 12 is not active. The central synchronizing unit 12 is not actuated while the positive connection between the idler gear 30 and the gearbox input shaft 26 is being established.

When the actuation period of the central synchronizing unit 12 has elapsed, the main group shifting unit 14 is synchronized. At the end of the actuation period, the open- and closed-loop control unit 18 applies an actuating pressure to the main group shifting unit 14. By applying pressure to the main group shifting unit 14, the actuator 56 displaces the selector sleeve 49 with the selector rod 53 axially towards the drive wheels 21. The actuator 56 moves the main group shifting unit 14 into its second shifting position, thereby setting a lower main group ratio in the main group 11. The actuation period of the central synchronizing unit 12 typically amounts to 20-50 milliseconds.

After a through-shift of the main group shifting unit 14 into the second shifting position, i.e. after a positive connection has been established between the main shaft 35 and the countershaft 19, the open- and closed-loop control unit 18 moves the clutch into its closed state and connects the group transmission device 10 to the motor 12. The change to a lower overall gear ratio and the selection of a next higher gear are now completed. The selection of a next higher gear is typically completed in approximately 350 milliseconds.

What is claimed is:

1. A group transmission device for a motor vehicle, comprising:
    a main group (11) with a central synchronizing unit (12) assigned to several shifting units (13, 14, 15) for synchronizing at least two main group shifting units (13, 14, 15) for changing a main group transmission ratio,
    at least one auxiliary group (16) with at least one auxiliary group shifting unit (17) for changing an auxiliary group transmission ratio, and a control unit (18) which is provided to actuate in a shifting operation the auxiliary group shifting unit (17) and the central synchronizing unit (12) in order to change an overall gear ratio,
    the (open and/or closed-loop) control unit (18) being provided to actuate the auxiliary group shifting unit (17) the central synchronizing unit (12) in parallel at least intermittently, the central synchronizing unit (12) permitting a synchronizing action independent of an actuation of the shifting with units (13, 14, 15).

2. The group transmission device according to claim 1, wherein the auxiliary group shifting unit (17) comprises a synchronizer and the control unit (18) is adapted to actuate the central synchronizing unit (12) of the main group (11) during a synchronization phase of the auxiliary group shifting unit (17).

3. The group transmission device according to claim 1, wherein the control unit (18) is an open- and/or closed-loop unit provided to synchronize the auxiliary group shifting unit (17) at least partially by means of the central synchronizing unit (12).

4. The group transmission arrangement according to claim 1, wherein the central synchronizing unit (12) comprises at least one active synchronizing actuator with a countershaft-mounted stator which is provided for changing a speed of a countershaft (19).

5. The group transmission device according to claim 1, wherein the central synchronizing unit (12) is pressure-controlled and the control unit (18) is provided to apply an actuating pressure to the central synchronizing unit (12) in an actuation phase of the auxiliary group shifting unit (17).

6. The group transmission device according to claim 5, wherein the auxiliary group shifting unit (17) is pressure-controlled and the control unit (18) is provided to apply an actuating pressure to the auxiliary group shifting unit (17) before the actuating pressure is applied to the central synchronizing unit (12).

7. The group transmission device according to claim 5, wherein the control unit (18) is provided to apply the actuating pressure to the central synchronizing unit (12) in a synchronization phase of the auxiliary group shifting unit (17).

8. The group transmission device according to claim 5, wherein the control unit (18) is provided to reduce the actuating pressure of the central synchronizing unit (12) essentially to zero during the actuation phase of the auxiliary group shifting unit (17).

9. The group transmission device according to claim 7, wherein the control unit (18) is in at least one operating state provided to reduce the actuating pressure of the central synchronizing unit (12) essentially to zero before the synchronization phase of the auxiliary group shifting unit (17) is completed.

10. A method for operating a group transmission device of a motor vehicle, the group transmission device comprising at least one main group (11) with at least one central synchronizing unit (12) for synchronizing at least two main group shifting units (13, 14, 15) for changing a main group transmission ratio, and at least one auxiliary group (16) with at least one auxiliary group shifting unit (17) for changing an auxiliary group transmission ratio, the method comprising the step of actuating the auxiliary group shifting unit (17) and the central synchronizing unit (12) in parallel at least intermittently in a shifting operation for changing an overall gear ratio.

* * * * *